April 24, 1951  F. T. GORSKI  2,550,465
INSULATING MATERIAL
Filed July 29, 1948
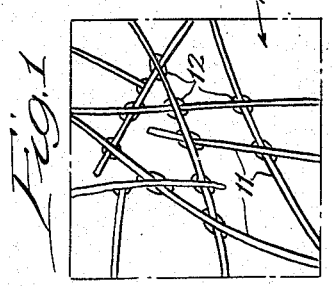
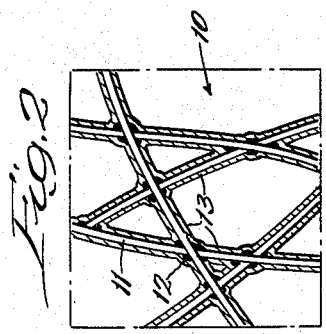
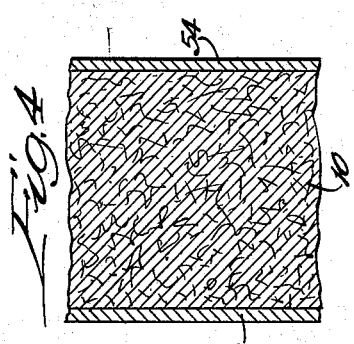
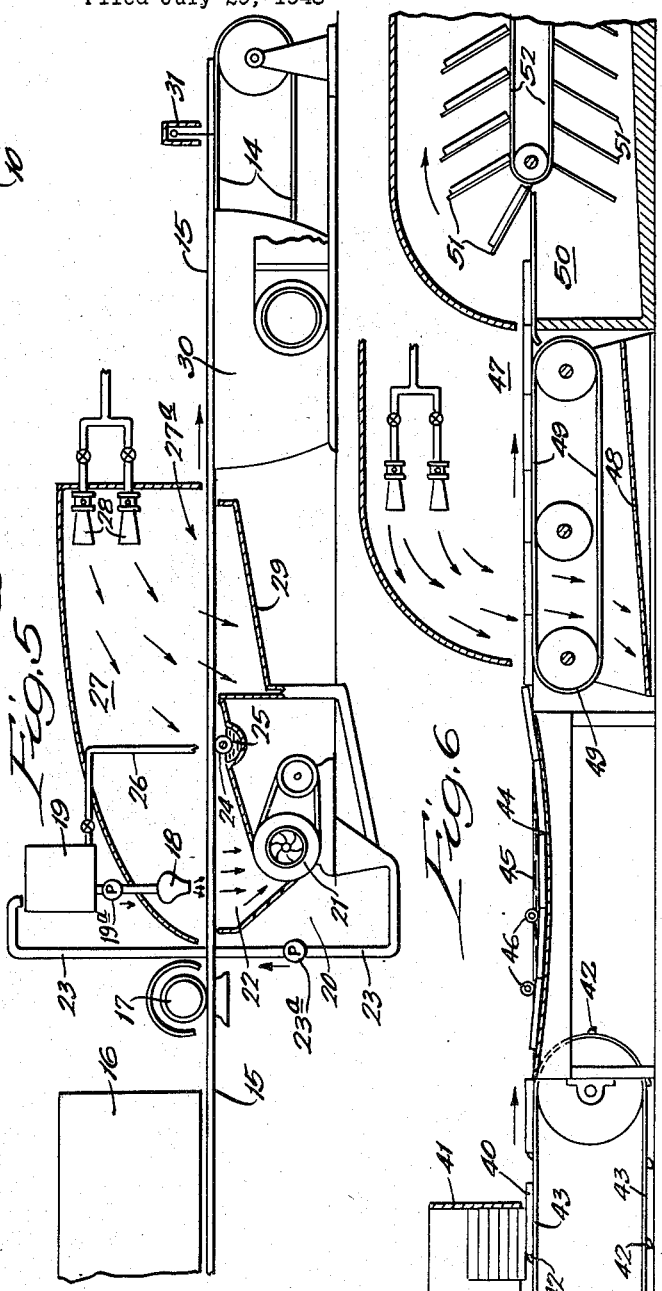
Inventor:
Florian T. Gorski,
By Staelin + Overman
Attorneys Patented Apr. 24, 1951

2,550,465

UNITED STATES PATENT OFFICE 2,550,465

INSULATING MATERIAL

Florian T. Gorski, Granville, Ohio, assignor to Owens-Corning Fiberglas Corporation, a corporation of Delaware Application July 29, 1948, Serial No. 41,224

9 Claims. (Cl. 154—44)

1

This invention relates to glass and other mineral fiber products which have particular application as thermal insulation, wall board, roofing, siding, and other like building materials. The products may also be used as electrical insulation, particularly as panel board.

It is an object of this invention to provide an insulation and structural material of glass fibers bonded into an integral body of relatively fixed dimensions and having greatly increased compressive strength, resistance to delamination, and nail-holding power over products known heretofore, and having at the same time sufficient porosity to enable its use as an insulation, wall board, siding, or other structural material.

More specifically, it is an object to produce a glass fiber board in which the fibers are secured one to another at their junctures by a relatively infusible, rigid binder to provide a porous mat of fixed dimension, the fibers subsequently being coated substantially throughout their lengths with a less rigid and more flexible material to impart a marked improvement in characteristics.

A further object is to produce a laminate having continuous spaced layers of resin-like material such as bitumens, and inner layers of a porous fabric of glass fibers secured one to another by an infusible binder and impregnated with a material partially to fill the voids of the porous fabric, the impregnant being compatible or strongly adherent to the continuous layers of resin-like material.

It is a still further object to provide a method for producing the product of the invention in an economical manner.

These and other objects of this invention will hereinafter appear and for purposes of illustration, not of limitation, embodiments of the invention are shown in the accompanying drawings, in which:

Figure 1 is a greatly expanded fragmentary view of a bonded glass fiber mat of the type adapted for subsequent treatment in the manner embodying the features of this invention;

Figure 2 is a greatly expanded fragmentary view of a treated mat embodying the features of this invention;

Figure 3 is a fragmentary top view of a product produced by this invention;

Figure 4 is a view of a segment of roof deck insulation in the form of a laminate embodying the features of this invention;

Figure 5 is an illustrated flow sheet showing the means for carrying out the invention; and Figure 6 is a flow sheet of a modified method for carrying out the invention.

2

The product of the invention is characterized by the fact that a fabric, web, mat, or board is first formed of glass fibers which are bonded one to another in a manner to form an integral porous mat of permanently fixed dimensions. Thereafter, the fibers of the porous mat are coated substantially throughout their lengths with a compound capable of imparting certain desirable characteristics to the mat. This coating may be achieved by impregnation of the mat and the impregnation may be regulated to incorporate only a small amount of impregnating materials, such for example, as equal proportions of the impregnant and mat on the weight basis, in which event, a highly porous product is produced which is particularly well adapted for insulation applications. The ratio of impregnant to mat, on the other hand, may run as high as 10 or 20 parts to one on the weight basis, in which case a dense and compact product is produced having few voids, and may be high enough, where desired, to provide a product that is substantially void-free, the resulting products having characteristics desirable for structural boards and insulations of great strength and which will hold nails, screws, or other fastening members.

In order to secure permanence with respect to the fiber arrangement in the product and correspondingly fixed and permanent dimensions of the final product, I secure the fibers one to another by an infusible and preferably an insoluble or relatively inert resin. In Bergin and Simison Patent No. 2,252,157, there is described a suitable process for producing mats of the types described wherein a mass of glass fibers are bonded one to another to form an integral porous product by a thermosetting resin of the types of phenol formaldehyde or urea formaldehyde in combination with an immiscible oil. When small amounts of such binder compositions are used with glass fibers they tend to migrate to the junctures of the fibers where they become set and as a result the desired permanence of fiber arrangement is secured with a minimum amount of resinous binder.

When a relatively fluffy fabric is desired, as little as 1% binder on the basis of weight of the finished mat has been found to be sufficient, but when it is desired to secure the fibers together in a high density mass of say 6 to 10 pounds per cubic foot, ordinarily 4 to 15% or more binder is used. In carrying out this invention, instead of securing the glass fibers in mat form with an immiscible oleaginous-phenolic mixture, suitable bonds may be secured with a heat-hardenable phenolic resin alone. Set conditions may be secured by other resinous materials capable of reaction to a stage wherein they are not softened by elevated temperatures to such an extent as to flow when impregnation is effected from a hot melt, are relatively resistant to solvents to which the mat may be subjected during the impregnating process, and have no cold flow.

Illustrative of other suitable fiber bonding materials for use with or without oleaginous or other hydrocarbon admixtures are the reaction products of an aldehyde such as formaldehyde, furfuraldehyde and the like with cresol, resorcinol, analine and the like, or with urea, melamine or other nitrogenous resin-forming derivatives. Use may be made of the polyesters such as the reaction products of polycarboxylic acids with polyhydric alcohols having sufficient functional groups or unsaturated groups capable of such linkages as will form an infusible product, and copolymers of the polyesters with vinyl derivative monomers such as styrene, vinyl chloride, vinyl acetate, acrylates and the like. I may also use the allylic polymers and copolymers thereof with polyesters and vinyl derivatives of the type described above.

The reaction products of furfural and furfuryl alcohol separately or in admixture with or without catalysts have also been used in the fabrication of mats of fixed dimension.

The desired characteristics of permanence in dimension may also be secured where more flexible and resilient binders are used, enabling a product of greater flexibility, softness, and resiliency to be produced. The principal ingredient in the binder is still cross-linked or of sufficiently high molecular weight to resist flow under impregnating conditions but is constituted of flexibilizing long chain groups or is modified or plasticized with flexibilizing ingredients. For example, a resilient or flexible binder may comprise an "A" stage phenolic resin in admixture or solution with an oil or a rubber compostion of the type "Buna-N" which includes various ratios of acrylonitriles copolymerized with butadiene. It may comprise a phenolic resin extended with natural resins, asphalts, or "Vinsol," which latter is the product of the steam distillation process of pine wood.

In the main, these resinous binders are relatively brittle in their cured stage with the result that the binder or fibers or both appear to crack or break under pressure or compression. This characteristic becomes more pronounced as the binder concentration in the mat is increased and a bat of interbonded fibers is handicapped for many applications for which it might otherwise be employed. Greater flexibility is secured with a reduction of binder concentration, but accompanied with such reduction is a loss of permanence of dimensions with the consequence that a board-like product cannot be produced.

I have found that exceptional properties are secured when the mat of interbonded glass fibers is subsequently treated with materials having less rigidity and/or less resistance to deformation than the basic binder.

I have found further that by the after-treatment of the bonded fabric with impregnants which, incidentally may be low cost materials, to coat the bonded fibers substantially throughout their lengths and partially to fill the interstices between the fibers in the fabric, there is produced a porous light-weight mineral fiber insulation product having greatly improved strength, especially compressive strength. The final product is still highly porous, which insures good insulating characteristics. The impregnated structure is much more resistant to delamination and has greatly improved nail-holding power than mineral fiber products heretofore known.

By controlling the density of the fibrous mass and the amount of impregnant, products having a density of several pounds per cubic foot up to as much as 80 pounds per cubic foot may be produced. Depending on the characteristics of the specific impregnant used, the product may have the characteristics of a resilient board or it may simulate a structure of marked hardness but even in the latter instance the product may be still sufficiently porous to have substantial insulating properties.

By the use of the subsequently applied impregnating compositions, the desired mass integrity of the product can be secured with the use of less of the initially applied and more expensive binder. By impregnation of the mat and coating of the fibers only through selected cross-sections of the mat, further economies can be effected while still obtaining, though in reduced measure, the desired properties in the final product. Impregnation in a manner to coat the fibers substantially throughout their lengths is effective to protect the fibers one from another to resist fiber disintegration by reason of abrasion during flexure of the mat, and to eliminate fly, or sifting out of broken fibers, as well as brashiness during flexure, compression or other fiber or mat deformation.

The desired characteristics are secured when the impregnant is a composition which, when set, has one or more of the properties of less rigidity and greater yieldability or flexibility than the binder securing the fibers together in the mat. Novel and improved characteristics are also secured when the impregnant is of the same general characteristic as the binder but preferably extended with less costly or modifying materials to reduce the ultimate cost of the product as well as to impart tailor-made characteristics.

Suitable impregnating compositions may be selected of materials such as bitumens, natural resins, synthetic resins, rubber-like materials and the like, and mixtures thereof.

The term "bitumens" is meant to include the various asphaltics which may be grouped to include mineral waxes, native asphalts, and asphaltic bitumens; tars and pitches of the type wood tar, wood tar pitch, coal tar, coal tar pitch, fatty acid pitches and the like; asphalts and waxes such as paraffin wax, petroleum wax, wax tailings and resins, and petroleum resins.

Natural resins include such materials as rosin, rosinates, and rosin derivatives; "Vinsol" (a product of the steam distillation of pine wood); gums, copal, dammar, lignin, and shellac.

Suitable synthetic resinous materials for impregnation preferably are selected of the thermoplastics which include the cellulosic ethers and esters of the type nitrocellulose, ethyl cellulose or other alkyl cellulose compositions, celluose acetate, cellulose butyrate and the like; polyalkyl acrylates represented by methyl methacrylate, butyl methacrylate and methylbutyl acrylate; polystyrene, polyethylene, polybutene, polyamides, coumarone-indene resins, polyterpene hydrocarbon resins, and polyvinyl compounds of the type polyvinyl chloride, polyvinyl acetate, polyvinyl acetals, copolymers of polyvinyl chloride and polyvinyl acetate and copolymers of polyvinylidene chloride with other compatible vinyl compounds.

When a dense and extremely hard board is desired, I have been able to impregnate mat initially bonded with hard thermosetting resins of the type previously described with like thermosetting compositions. However, in this instance it is preferable to extend the resinous binder with compatible low cost plasticizing materials, such as compatible oils, liquid plasticizing resins, bitumens, petroleum resins and the like.

Suitable rubber-like compositions capable of producing a resilient cushion-like product, especially when more flexible binders are employed as the mat binder are represented by the synthetic rubbers including Buna-N (the copolymer of acrylonitrile with butadiene), Buna-S (the copolymer of butadiene with styrene), chloroprene polymers, organic polysulfides, chlorinated rubber and the like.

Impregnating compositions may comprise the above materials when used alone or one or more of the materials in admixture with others whether they be in the same class or of other classes of the type described. For instance, the impregnant may be a bitumen or it may be a bituminous substance in admixture with a phenolic or a polystyrene resin.

Referring to the drawing, a porous mat 10 of glass fibers 11 secured at their junctures with a relatively non-flowable and rigid binder 12 is treated with impregnant in a manner to coat the fibers substantially throughout their lengths and partially to fill the voids or the interstices between the fibers with impregnant material 13. The impregnant ordinarily is applied in liquid form and is adapted to be hardened or set at temperatures of use to produce an insulation, wall board, siding, and the like.

The bonded mat may be prepared by the process of the Bergin and Simison Patent No. 2,252,157 wherein the phenolic binder is applied to the fibers as they are rained down from above and collected on a supporting screen which may comprise an endless belt 14, the fibers being collected thereon in a somewhat felted haphazard arrangement. By controlling the rate of fiber deposition and the linear movement of the belt 14, the thickness of the fibrous deposit can be controlled from that of a relatively thin mat of about 1/8 to 1/4 inch to a bat of several inches thickness. The binder, which may be a solution or dispersion of uncured phenolic, urea or the like cross-polymerizible resin with or without incompatible oleaginous materials, may be applied as the fibers are collected on the belt 14 or else it may be after-applied by flow coating, spraying, dipping or other suitable means. To produce a formed mat of fixed dimension, the bat is compressed while the binder is advanced to set conditions under the influence of heat, catalyst or other activating systems. The product is a rather endless web 15 of fixed dimension which may be run in continuous fashion through the successive steps embodied in this invention.

Referring now to Figure 5, the bonded web 15 may be led directly from the treating oven 16 to a sander 17. The impregnant material 13 stored in a reservoir 19 is forced by a pump 19a to spray guns 18 for delivery onto the web. When the impregnant is a thermoplastic such as a bitumen, petroleum resin, waxy material or a synthetic thermoplastic of the type ethyl cellulose, it may be applied from solution or emulsion or alternatively the reservoir may be heated and the impregnant may be applied as a hot melt. When the impregnant is a material incapable of fluid flow responsive to elevated temperatures, or else when it contains a material of the heat curable type which is sensitive to elevated temperatures, the impregnant may be applied as a solution or dispersion in suitable diluents, such as solvents or water.

The underside of the web 15 in the region of impregnation is sufficiently confined by a chamber 20 to enable a suction pump 21 to create subatmospheric conditions which are effective to draw a calculated portion of the impregnant through the web, thereby to insure uniform impregnant distribution as well as to regulate, to some extent, the amount of impregnant which remains in the web. The drip or withdrawn impregnant, indicated by arrows 22, is collected in the chamber and returned by a pump 23a through passages 23 to the reservoir 19.

Instead of spraying the impregnating material onto the surface of the web, a flow process may be employed in combination with the vacuum means to effect the desired impregnant penetration and distribution. The fibers on the underside of the web may be positively coated by a roller 24 operating in a bath 25 fed by a conduit 26 from the reservoir 19.

Ordinarily the entire impregnating area and an additional zone 27a is enclosed to form a chamber 27 which is heated by burners 28 to a temperature sufficient to maintain the impregnating materials at fluid condition so that excess impregnant may be permitted to drain from the web. For example, when asphaltic materials or petroleum resins or mixtures thereof are used, temperatures in the range of about 250° to 300° F. are sufficient for the lower melting point tars and pitches, while temperatures in excess of the range of 350° F. may be required for pyrobitumens, gilsonites, and the like. In addition to rendering the impregnant more fluid, the heat applied from the burners 28 may operate to drive off diluents or to advance the cure of resinous materials when such materials are incorporated as a part of the impregnant.

It will be significant that during impregnation and heating as described, the relative positions of the fibers in the web will remain substantially the same so that the web will hold its fixed dimension because the binder 12 securing the fibers together at their junctures is of the type which is unaffected by the heat and generally inert to the solvents, diluents, or applied impregnating materials. The substance that drains from the bat in the heating zone 27 may be collected by the pans 29 to be returned for reuse to the reservoir 19.

By regulating the amount of impregnation and the solids in the impregnating composition, and by controlling the temperatures in the heating zone, the concentration of impregnant that remains in the web may be selectively predetermined. Thus it may be varied from a condition wherein the impregnant merely coats the fibers as illustrated in Figure 2 to produce a very porous insulation, or it may be so controlled that the greater portion of the impregnant remains in the web to produce a relatively dense product in which the ratio of impregnant to bonded fibers may run as high as 10 or even 20 parts to one.

From the heated chamber 27, the impregnated web is led by the belt 14 through a refrigerating zone 30 where the impregnant is cooled to set conditions as by passing the refrigerated air through the pores of the web. Then in continuous fashion, it is sectioned into boards or mats for use or for packaging for shipment to distant stations, such sectioning means may comprise an element such as the guillotine 31.

In a modified system, shown in Figure 6 of the drawing, pieces 40 of the molded and bonded porous web 15 are stacked behind a wall 41 and they are displaced individually from the bottom of the stack by cleats 42 secured cross-wise to an endless belt 43. The displaced pieces are advanced to an impregnating bath 44 having the desired impregnant 45 in fluid form at a level sufficient completely to immerse the pieces 40 as they are passed under rollers 46. During immersion, the pores of the bonded fibrous material become filled with the liquid impregnant whereon the pieces fall to the bottom of the impregnating tank 44 as they are advanced by the oncoming pieces fed by the belt.

From the tank 44, the impregnated pieces pass into and through a heated area 47 for reaction as previously described in connection with the heated zone 27 of Figure 5. Here the impregnant materials are rendered sufficiently fluid to drain excesses thereof from the bat and the heat operates additionally to remove volatiles when used or to advance heat-hardenable ingredients when forming a part of the impregnating composition. The drip is collected on pans 48 and stored in suitable containers for reuse. These pieces of impregnated material may be advanced through the heating zone by the oncoming pieces or they may be positively carried through the zone by a belt 49 as shown. After the pieces have been subjected to the desired amount of heating, they are advanced through a refrigerating zone 50 to set the impregnant, and in which zone they may be separately conveyed by carriers 51 secured to an endless belt 52.

Other means employing the same general principles described, may be employed to effect the desired impregnation. For example, the impregnant in fluid form may be forced by one or more pressure guns (not shown) through the web. In this connection it is possible to impregnate the web only in localized, spaced-apart areas, and similarly to the previously described form of the invention these impregnated sections provide connection between the opposite faces of the web by the more resilient impregnant to impart some of the described properties, especially resistance to delamination of the web and increased resistance to compression.

The impregnated porous mat 10 may be used as is for insulation, siding, or structural board. It may be further coated on one or both sides with layers 53 and 54 of resinous material or resin-like materials of the type described to produce a laminate having a core of porous fabric 10 faced with continuous layers 53 and 54 of material. For example, an insulation board bonded with a phenolic resin, impregnated with a bitumen, petroleum resins or mixtures thereof, and coated on its outer surfaces with a bituminous layer finds extensive use as a roof deck insulation which may be used as is or may be subsequently treated after laying with the usual asphaltic coatings. Ordinarily layers 53 and 54 are comprised of materials capable of strongly adhering to the fabric 10 either through partial penetration of the pores or through chemical welding such as fusion of compatible materials.

The following are illustrative of suitable binder compositions by which the glass fibers may be secured together in web or permanently fixed dimensions.

Example 1

30 percent phenolic "A" stage resin
3 percent sulphonated hydrocarbon oil
67 percent water

Example 2

30 percent phenolic resin ("A" stage)
15 percent Vinsol
55 percent water

The Vinsol may be reacted with the phenolic resin or added thereto in the above mixture.

Example 3

6 percent phenolic "A" stage resin
14 percent acrylonitrile-butadiene copolymer
80 percent water The composition is applied as an emulsion.

Example 4

15 percent "A" stage phenolic resin
5 percent steam refined asphalt
80 percent water The composition is applied as an emulsion of the asphalt in water-resin solution.

Example 5

20 percent of the reaction product of furfuryl alcohol in the presence of acids at elevated temperature
80 percent water The following formulations are illustrative of the impregnating compositions which may be applied in accordance with this invention:

Example 6

Asphalt M. P. 130°–150° F.

Applied directly as a hot melt at 150°–175° F.

Example 7

50 percent asphalt M. P. 130–150° F.
50 percent petroleum resin

Applied as a hot melt at 175°–300° F.

Example 8

60 percent Vinsol resin
40 percent water

Applied as a water emulsion.

Example 9

40 percent "A" stage phenolic resin
25 percent Vinsol
35 percent water

Applied as a water dispersion. The discrete particles of resin fuse at the subsequent heating step to form a composite mass.

Example 10

70 percent "A" stage phenolic resin
30 percent water

Applied as a solution.

It will be apparent from the descriptions, that I have produced a new and novel composition of matter comprising glass fibers bonded one to another by rigid, non-yielding resinous material which may also be an infusible material to form a porous web having fixed dimension, which is resistant to deformation, and responsive to after-treatment by impregnating materials applied in hot melt or diluted form. The subsequently impregnated or treated mat or board has the characteristics to impart yieldability, increased strength, fiber protection, density and nail-holding power to the initial web, and it is adapted to impart these characteristics with a reduced concentration of the more expensive binder material securing the fibers in the original porous fabric.

A cardinal feature of this invention resides in the construction of the impregnated product wherein the impregnant is applied in a manner to coat the fibers substantially throughout their lengths to protect the fibers against disintegration by abrasion and partially to fill the pores by a predetermined amount to produce a board suitable for many purposes. The board may be further treated with continuous outer layers of suitable materials to provide a laminate adapted as roof deck insulation, siding, and the like.

The invention also contemplates the methods by which the new and improved product is produced, employing successive steps of impregnation and such combination treatments as will drain excesses of impregnant over and above the calculated amount, and which subsequently causes the setting of the impregnant remaining in the web in situ on the fibers to produce the final product which is relatively stable at temperatures of use.

It will be understood that numerous changes may be made in the compositions of the binder, the impregnant and in the treating steps to which the web is subjected in producing the final product without departing from the spirit of the invention, especially as defined in the following claims.

I claim:

1. An article of manufacture comprising a mass of glass fibers, an insoluble and infusible resinous material bonding the fibers at their intersections to form the fibers into an integrated porous body, and a thermoplastic resin impregnating the bonded mass of glass fibers to coat the fibers substantially throughout their lengths.

2. An article of manufacture comprising a mass of glass fibers, from 1 to 10 per cent by weight of an insoluble and infusible resinous material binding the fibers together at their intersections into an integrated porous body of predetermined shape, and from 1 to 20 parts by weight of a thermoplastic material to one part by weight of the bonded mass of glass fibers impregnating the bonded mass of glass fibers.

3. An article of manufacture as claimed in claim 2 in which the insoluble and infusible binder is a phenol formaldehyde resin advanced to a set stage of polymeric growth.

4. An article of manufacture as claimed in claim 2 in which the binder is a compatible phenol formaldehyde butadiene acrylonitrile polymerization product advanced jointly to a cured stage.

5. An article of manufacture as claimed in claim 2 in which the infusible and insoluble resinous binder is a phenol formaldehyde-bitumen combination.

6. An article of manufacture as claimed in claim 2 in which the impregnant is a bitumen.

7. An article of manufacture as claimed in claim 2 in which the impregnant is a thermoplastic resinous material.

8. An article of manufacture as claimed in claim 2 in which the impregnant is an elastomer.

9. An article of manufacture as claimed in claim 2 in which the bonded and impregnated mass of glass fibers is faced on at least one side with a continuous layer of a bituminous material.

FLORIAN T. GORSKI.

REFERENCES CITED

The following references are of record in the file of this patent:

UNITED STATES PATENTS

| Number | Name | Date |
| --- | --- | --- |
| 1,899,056 | Powell | Feb. 28, 1933 |
| 2,070,330 | Chase | Feb. 9, 1937 |
| 2,252,157 | Bergin et al. | Aug. 12, 1941 |
| 2,292,118 | Guhl | Aug. 4, 1942 |
| 2,341,130 | Unsworth | Feb. 8, 1944 |
| 2,349,909 | Meharg | May 30, 1944 |
| 2,433,847 | Jennings et al. | Jan. 6, 1948 |

FOREIGN PATENTS

| Number | Country | Date |
| --- | --- | --- |
| 525,556 | Great Britain | Aug. 30, 1940 |